United States Patent
Baldwin et al.

(10) Patent No.: US 9,186,982 B2
(45) Date of Patent: Nov. 17, 2015

(54) FUEL TANK PRESSURE-RELIEF VENT TO PREVENT EJECTION OF FUEL DURING REFILL

(75) Inventors: Damien Baldwin, Belleville, MI (US); Michael William Soltis, Ann Arbor, MI (US); Jeffrey Dumler, Walled Lake, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 381 days.

(21) Appl. No.: 13/594,144

(22) Filed: Aug. 24, 2012

(65) Prior Publication Data

US 2014/0053947 A1 Feb. 27, 2014

(51) Int. Cl.
*B60K 15/035* (2006.01)
*B60K 15/03* (2006.01)

(52) U.S. Cl.
CPC ......... *B60K 15/035* (2013.01); *B60K 15/03519* (2013.01); *B60K 2015/03217* (2013.01); *B60K 2015/03296* (2013.01); *B60K 2015/03514* (2013.01); *B60K 2015/03523* (2013.01); *B60K 2015/03576* (2013.01)

(58) Field of Classification Search
CPC ........... B60K 15/035; B60K 15/03519; B60K 2015/03217; B60K 2015/03296; B60K 2015/03514; B60K 2015/03523; B60K 2015/03576
USPC ................... 141/5, 59, 94–95, 392; 220/86.2; 123/1 A
See application file for complete search history.

(56) References Cited

U.S. PATENT DOCUMENTS

| | | | |
|---|---|---|---|
| 2,353,181 A | 7/1944 | Neef, Jr. | |
| 3,979,010 A | 9/1976 | Fiedler et al. | |
| 4,821,908 A * | 4/1989 | Yost | 141/59 |
| 5,052,437 A | 10/1991 | Danna | |
| 5,183,087 A * | 2/1993 | Aubel et al. | 141/59 |
| 5,449,029 A * | 9/1995 | Harris | 141/198 |
| 5,462,100 A * | 10/1995 | Covert et al. | 141/59 |
| 5,568,828 A * | 10/1996 | Harris | 141/348 |
| 5,687,778 A * | 11/1997 | Harris | 141/59 |
| 5,797,434 A * | 8/1998 | Benjey et al. | 141/59 |
| 5,975,154 A | 11/1999 | Bennett | |
| 6,863,095 B2 * | 3/2005 | Osaki et al. | 141/44 |
| 7,617,851 B2 * | 11/2009 | Barnes et al. | 141/286 |
| 2004/0144444 A1 | 7/2004 | Osaki et al. | |
| 2011/0233236 A1 | 9/2011 | Brown et al. | |

FOREIGN PATENT DOCUMENTS

| | | |
|---|---|---|
| DE | 3643031 A1 | 6/1988 |
| DE | 19911489 A1 | 10/1999 |
| JP | 2007302156 A | 11/2007 |

* cited by examiner

*Primary Examiner* — Nicolas A Arnett
(74) *Attorney, Agent, or Firm* — Julia Voutyras; Alleman Hall McCoy Russell & Tuttle LLP

(57) ABSTRACT

A fuel tank having an interior space defined by a wall, a fill tube to admit fuel into the interior space, and a vent to discharge air and vapor from the interior space as the fuel is admitted. The vent includes a vent tube extending through the wall and downward into the interior space, and having a non-circular opening. In this manner ejection of fuel from the fill tube can be prevented reliably under a wide range of refueling conditions, and without imparting excessive length to the vent tube.

20 Claims, 8 Drawing Sheets

FUEL TANK PRESSURE-RELIEF VENT TO PREVENT EJECTION OF FUEL DURING REFILL

TECHNICAL FIELD

This application relates to the field of motor-vehicle engineering, and more particularly, to a motor-vehicle fuel tank and methods for refilling the same.

BACKGROUND AND SUMMARY

A fuel tank for a motor vehicle generally includes a fill tube through which fuel is added to the tank, and a vent tube through which displaced air and vapor exit the tank. In a typical refueling operation, fuel is supplied to the tank through a nozzle, which is designed to cut off the supply of fuel when the tank becomes full. To this end, the nozzle may include a pressure-actuated cut-off valve. The fuel tank may signal fullness by providing an increased internal pressure, which forces fuel up the fill tube to close the valve and cut off the supply of fuel. One way to achieve this is to provide, inside the tank, a vent tube with a substantially horizontal opening. The vent tube is positioned in the tank such that the horizontal opening is below the level of the fuel only when the tank is full. The other end of the vent tank is maintained at or near atmospheric pressure.

As fuel is admitted to the fuel tank, displaced air and vapor are relieved through the vent tube, keeping the pressure in the tank and fill tube only slightly above atmospheric pressure. However, when the fuel level rises to meet the horizontal opening of the vent tube, air and vapor can no longer exit the vent tube, and the incoming fuel causes an increase in the internal pressure of the tank and the fill tube. This pressure increase causes fuel to travel up the fill tube, where it is sensed by the nozzle, causing the flow of fuel to be cut off.

The configuration summarized above is effective at preventing catastrophic spillage of fuel during unattended refueling, but does not always result in an ideal refueling experience. In some cases, when the tank reaches the full level, the internal pressure in the fill tube rises so abruptly that fuel already in the fill tube is ejected back out through the fill tube. This event is called 'spit-back' if ejection occurs promptly when the tank reaches the full level, and 'well-back' if it occurs after some delay. Both events are undesirable, as they may result in fuel being spilled on a motorist or service-station attendant, or on the exterior of the vehicle. Furthermore, any discharge of fuel outside the vehicle is wasteful, and contributes to overall hydrocarbon emissions.

Ejection of fuel from the fill tube of a motor vehicle has been addressed previously. For example, U.S. Patent Application Publication Number 2004/0144444 discloses a vent tube for a motor-vehicle fuel tank that extends to a significant height outside the tank. The reference indicates that the abrupt pressure increase at the full level is reduced due to fuel flowing up the vent tube against an increasing head pressure. The inventors herein have determined, however, that this solution may not be sufficient for all motor-vehicle refueling scenarios, and may not be adaptable to all motor vehicles. In particular, the amount of pressure reduction realized in this approach may not be sufficient to completely prevent ejection of fuel from the fill tube, depending on refueling conditions. In addition, the extended length of the vent tube may cause fittability issues in some motor vehicles.

Accordingly, one embodiment of this disclosure provides a fuel tank having an interior space defined by a wall, a fill tube to admit fuel into the interior space, and a pressure-relief vent to discharge air and vapor from the interior space as the fuel is admitted. The pressure-relief vent includes a vent tube extending through the wall and downward into the interior space. The vent tube has a non-circular opening. Using a pressure-relief vent of this description, ejection of fuel from the fill tube can be prevented reliably under a wide range of refueling conditions, and without causing fittability issues.

The summary above is provided to introduce a selected part of this disclosure in simplified form, not to identify key or essential features. The claimed subject matter, defined by the claims, is limited neither to the content of this summary nor to implementations that address the problems or disadvantages noted herein.

DETAILED DESCRIPTION

Figure 1:
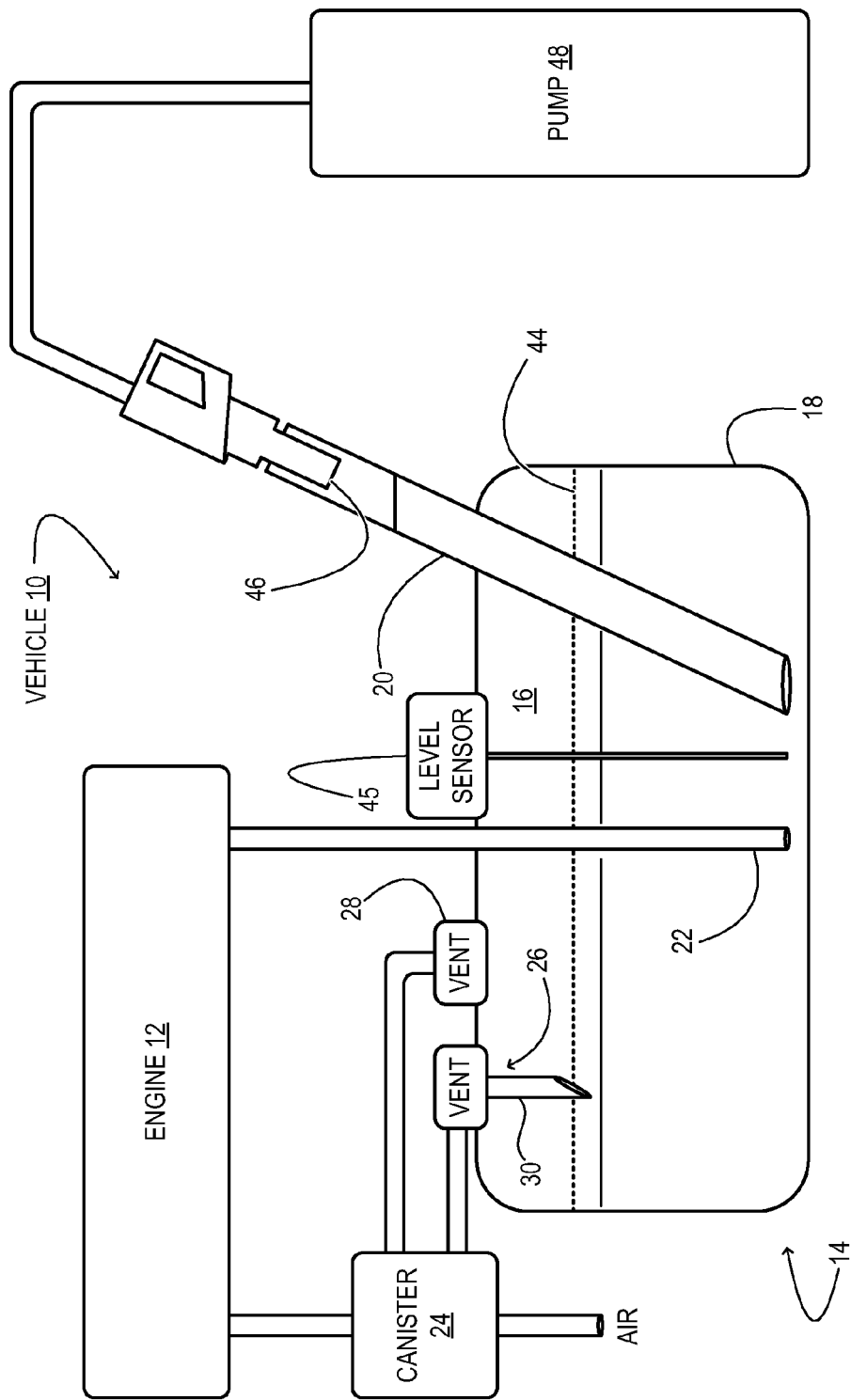
FIG. 1 shows aspects of a motor vehicle in accordance with an embodiment of this disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. Except where particularly noted, the drawing figures included in this disclosure are schematic and generally not drawn to scale. Rather, the various drawing scales, aspect ratios, and numbers of components shown in the figures may be purposely distorted to make certain features or relationships easier to see.

FIG. 1 shows aspects of an example motor vehicle 10. The motor vehicle includes an engine 12 and a fuel tank 14. The fuel tank includes an interior space 16 defined by a wall 18. Fuel is admitted to the interior space through fill tube 20, and is supplied to the engine through siphon 22. The fuel may include diesel fuel, gasoline, alcohols such as ethanol or methanol, or mixtures thereof. In the embodiment of FIG. 1, the fuel tank is vented to the atmosphere through purgeable sorbent canister 24. Material—e.g., carbon—contained within the sorbent canister sorbs fuel vapor that would otherwise be released to the atmosphere from the fuel tank. In some embodiments, suitable flow-control componentry may be coupled to the sorbent canister to allow sorbed fuel to be purged into the engine under appropriate conditions.

Sorbent canister 24 communicates with fuel tank 14 via two, separate vents: pressure-relief vent 26 and vacuum-relief vent 28. Having a vent tube 30 that extends through wall 18 and downward into interior space 16, the pressure-relief vent discharges air and vapor from the interior space as the fuel is admitted. The vacuum-relief vent allows air to enter the fuel tank as the fuel in the tank is drawn out. The pressure- and vacuum-relief vents also cooperate to keep the fuel tank close to atmospheric pressure despite changes in ambient temperature, altitude, etc. In some embodiments, flow-control componentry may be coupled to both the pressure- and vacuum-relief vents. Such componentry may be configured to prevent fuel from flowing out of the tank if vehicle 10 is overturned or laying on its side, or to provide other functions.

No aspect of FIG. 1 should be understood in a limiting sense, for numerous other embodiments are contemplated as well. For instance, although the fuel tank is vented to the atmosphere via a sorbent canister in some embodiments, the sorbent canister may be omitted in other embodiments. In some diesel-engine configurations, in particular, the sorbent canister may be omitted.

Figure 2:
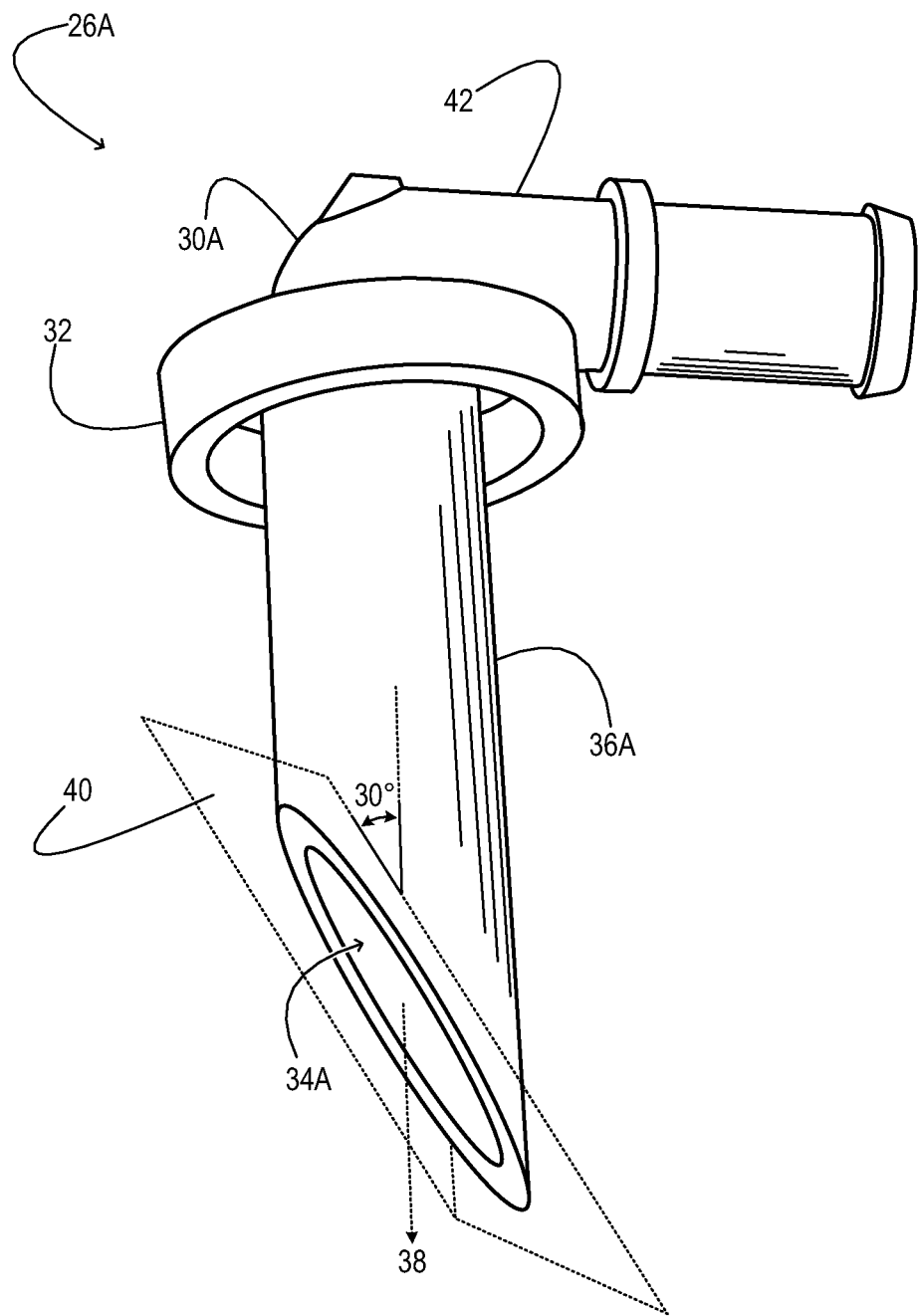
FIG. 2 shows aspects of a pressure-relief vent in accordance with an embodiment of this disclosure.
Figure 3:
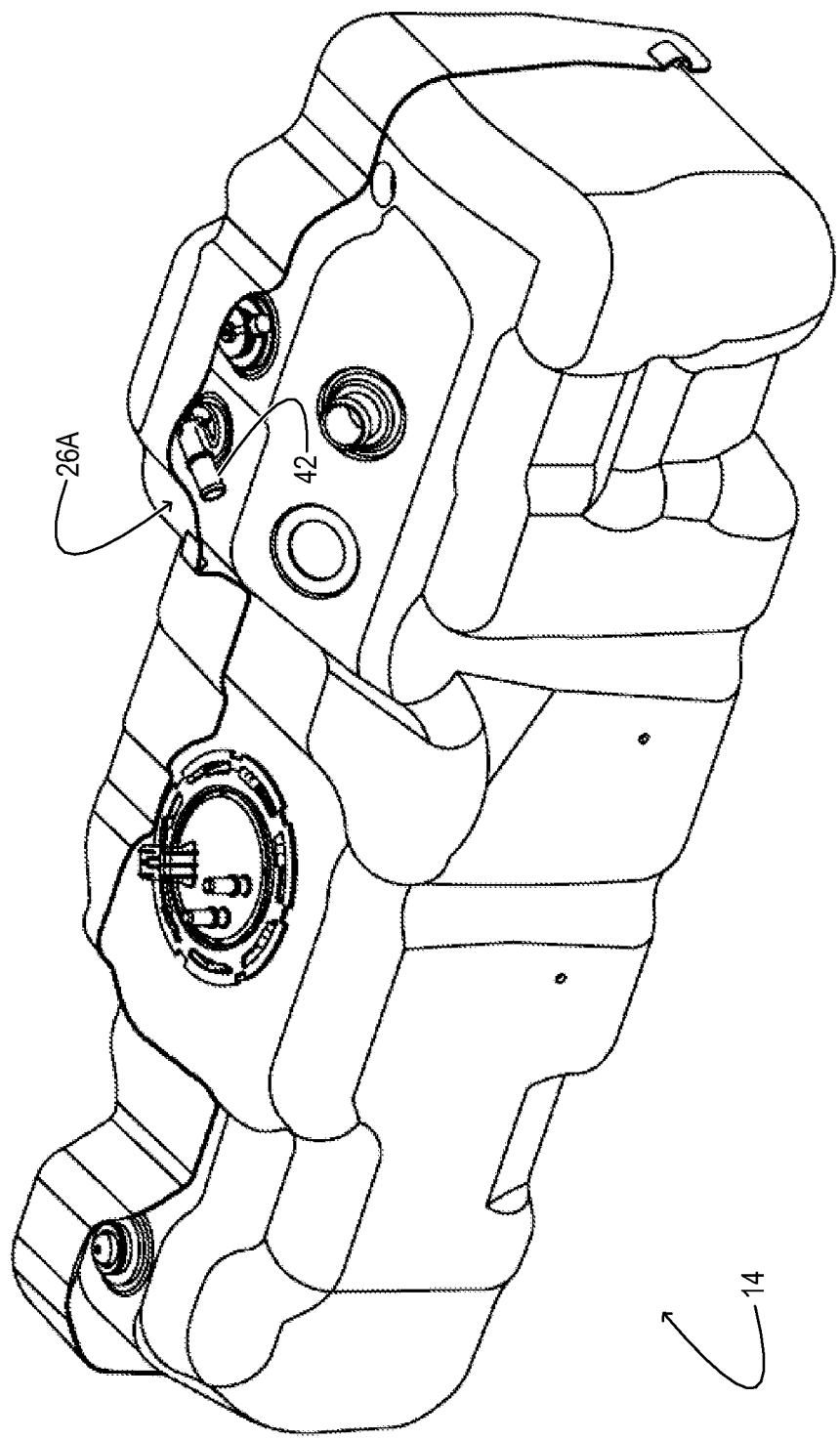
FIG. 3 is a perspective view of a fuel tank in accordance with an embodiment of this disclosure.
Figure 4:
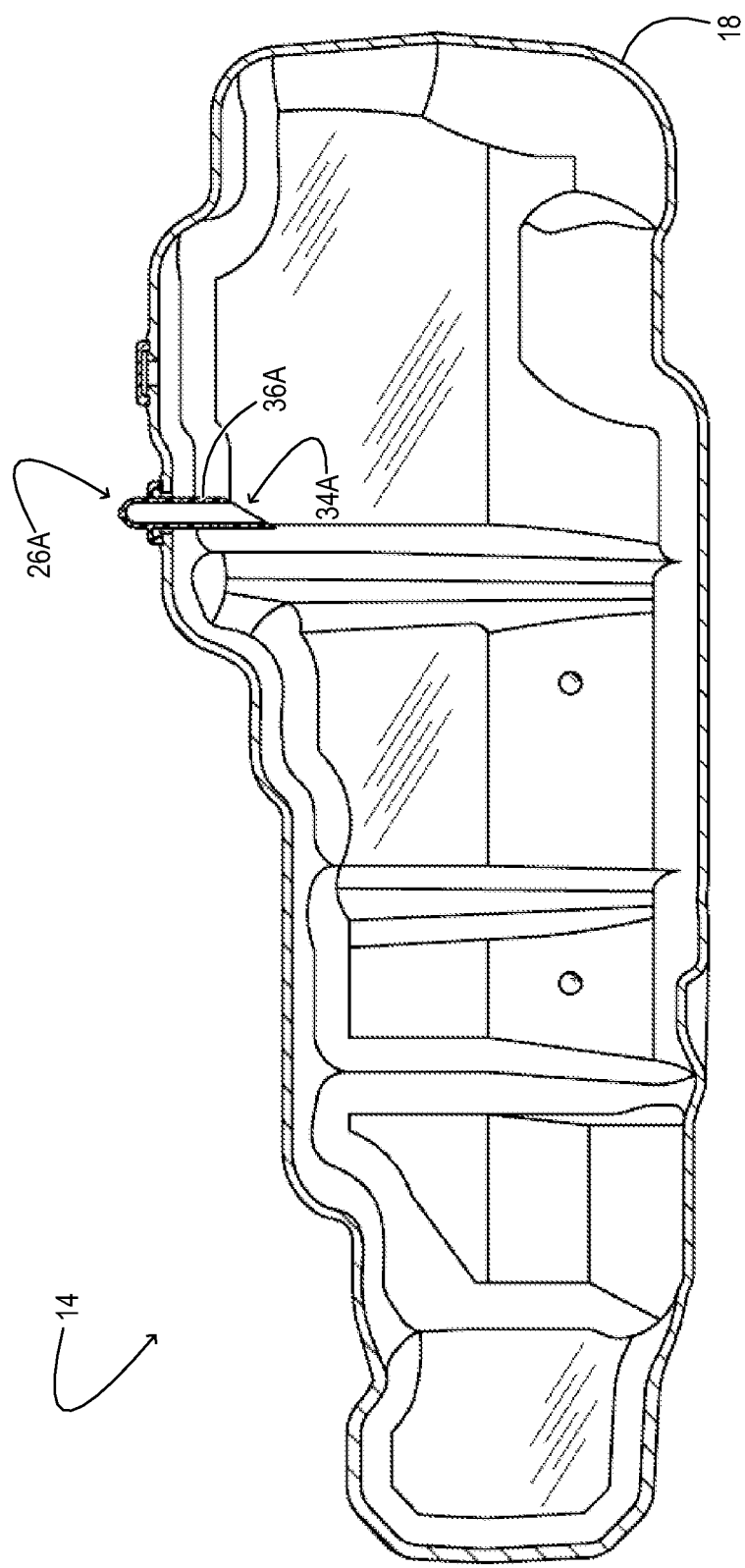
FIG. 4 shows a cross section of the fuel tank of FIG. 3 in accordance with an embodiment of this disclosure.

FIG. 2 shows aspects of an example pressure-relief vent 26A in one embodiment. FIG. 3 is a perspective view of fuel tank 14 showing the position of the pressure-relief vent, and FIG. 4 is a cross-sectional view of the fuel tank and the pressure-relief vent. FIGS. 2, 3, and 4 are drawn to scale in one, non-limiting embodiment. It will be understood, however, that embodiments that differ from the content of the drawings are also contemplated.

Turning now to FIG. 2, vent tube 30A extends through a sealing cap 32 that couples vent 26A to wall 18. In one embodiment, the entire vent—i.e., vent tube plus sealing cap—may be formed as a single molded article. In the illustrated embodiment, the vent tube has a non-circular opening 34A. More specifically, the opening in the vent tube is elliptical. As illustrated in FIG. 2, the opening 34A itself forms the end of the vent tube in this example, as opposed to being formed in a wall of the vent tube, and there is no portion of the vent tube below the opening 34A. Further, the opening 34A is fully open around the entire circumference of the vent tube at its end, without any interruption or other obstruction blocking any portion of the non-circular opening. In this way, the non-circular opening 34A is fully unblocked and unrestricted. As is also shown in FIG. 2, in a region around the non-circular opening, the vent tube is fully circular, throughout the entire vertical length of the opening, without any narrowing or other restriction. Both the interior and the exterior of the vent tube are smooth and continuous around the region of the non-circular opening 34A. FIG. 2 also illustrates how the non-circular opening faces outward for only exactly 180 degrees around the vertical axis.

In this and other embodiments, the vent tube includes a cylindrical inlet portion 36A, which is disposed in interior space 16 in the assembled fuel tank 14. In the illustrated embodiment, opening 34A is oblique to the cylindrical inlet portion. More specifically, the opening is oblique to a central axis 38 of the cylindrical inlet portion, and to any line or plane parallel to the central axis. The opening is also oblique to the horizontal, which may be defined as a direction parallel to the liquid-vapor interface in the fuel tank, when the vehicle is resting on a level surface. In the illustrated embodiment, the opening is defined by an intersection of the cylindrical inlet portion in a plane 40, which is oblique to the cylindrical inlet portion. In FIG. 2, the plane is rotated substantially thirty degrees from the central axis of the cylindrical inlet portion, or sixty degrees from the horizontal.

As shown in FIG. 4, vent tube 30A may extend vertically through wall 18 of fuel tank 14—i.e., cylindrical inlet portion 36A may be disposed vertically. In addition, the portion of the vent tube outside the wall, portion 42 in FIGS. 2 and 3, may be non-vertical. In the embodiment shown in FIG. 3, portion 42 of the vent tube is oriented horizontally—i.e., ninety degrees relative to the cylindrical inlet portion disposed in the interior space. In this and other embodiments, the vent tube may extend only marginally above the highest point on wall 18.

Additionally, in one embodiment the fuel tank 14, as shown in FIG. 4, includes various vertical extensions and volumetric protrusions due to packaging constraints in the vehicle. As shown, the upper most exit of pressure-relief vent 26 is higher than the highest internal space of the fuel tank 14, while the inlet to the pressure-relieve vent 26 (e.g., non-circular opening 34A) is below an uppermost volumetric protrusion.

Returning now to FIG. 1, vent tube 30 extends marginally below a predetermined full level 44 of fuel in the fuel tank. The predetermined full level may be the level of fuel that substantially fills the tank, but allows an adequate head space for liquid and vapor expansion. To put it another way, the predetermined full level may be the level of fuel that causes level sensor 45 to indicate a 'full tank'. The vent tube may extend less than two inches below the predetermined full level of the fuel tank, in one embodiment, or less than one inch in another embodiment. In one embodiment, the predetermined full level may bisect the opening of the vent tube.

As shown in FIG. 1, fuel is admitted to fill tube 20 via nozzle 46, which receives the fuel from pump 48. The nozzle and pump may be standard commercial or non-commercial service-station equipment. Accordingly, the nozzle may be an automatic fuel-sensing nozzle designed to cut off the flow of fuel when the tank becomes full. To this end, the nozzle may include a pressure-actuated cut-off valve, which cuts off the supply of fuel when the fuel in the fill tube reaches the nozzle. With the configurations disclosed herein, the internal pressure in the fill tube smoothly increases as the fuel level rises to the predetermined full level. This is due to the non-occluded area of the opening of the pressure-relief vent tube—opening 34A, for example—decreasing smoothly as the fuel level rises to cover the opening. The smoothly decreasing area provides smoothly increasing resistance to air and vapor flow through the pressure-relief vent.

The configurations disclosed herein stand in contrast to those of state-of-the-art fuel tanks, in which the pressure-relief vent tube has a circular and substantially horizontal opening. There, the non-occluded area of the opening decreases abruptly, from its full geometric area to zero, just as the fuel rises infinitesimally above the opening. The inventors herein have determined that the abrupt collapse of the non-occluded area at the full level causes the internal pressure in the fuel tank to increase abruptly and excessively, which may cause fuel to be ejected from the fill tube. The inventors have further determined that, in certain automobile and light-truck fuel tanks having this type of pressure-relief vent, a flow rate in excess of sixteen gallons per minute is likely to cause fuel to be ejected from the fill tube. Moreover, the problem appears to be exacerbated when fuel is admitted from a nozzle twenty-five millimeters or less in diameter, possibly due to a jetting effect.

To investigate the effects of vent-tube geometry on fuel-tank pressure and fuel ejection, pressure-relief vents were constructed with a series of different openings: (A) a circular, horizontal opening; (B) a circular, horizontal opening with a one-sixteenth inch hole one inch from the opening; (C) a circular, horizontal opening with a three-sixteenths inch hole one inch from the opening; (D) an elliptical opening oriented sixty degrees from the cylindrical inlet portion of the vent tube; and (E) an elliptical opening oriented thirty degrees from the cylindrical inlet portion. Each of the pressure-relief vents was coupled to each of two different light-truck fuel tanks, F and G, and the following results were obtained on refilling the fuel tanks at seventeen gallons per minute, from a twenty-four millimeter diameter nozzle. The table below lists the measured peak tank pressure and the measured amount of ejected fuel for a number of trials. In each of the trials, all ejected fuel was in the form of well-back.

|  | tank F | | tank G | |
|---|---|---|---|---|
|  | pressure/in H$_2$O | mL well-back | pressure/in H$_2$O | mL well-back |
| vent A | 16.76 | 20 | 16.83 | 30 |
|  | 16.27 | 21 | 16.56 | 89 |
| vent B | 14.6 | 15 | 15.75 | 35 |
|  | 15.52 | 18 | 15.82 | 34 |
| vent C | 17.57 | 45 | 15.68 | <1 |
|  | 13.45 | 0 | 14.06 | <1 |
| vent D | 14.8 | 0 | 16.29 | 25 |
|  | 15.48 | 18 | 15.2 | 1 |
|  | 13.58 | 0 | 15.48 | 0 |
| vent E | 12.97 | 0 | 12.5 | 0 |
|  | 13.72 | 0 | 14.73 | 0 |
|  | 12.1 | 0 | 14.19 | 0 |

These data show inter alio that the peak tank pressure correlates with the volume of ejected fuel, and that vent E afforded both the lowest peak tank pressure and the lowest volume of ejected fuel for both fuel tanks.

Figure 5:
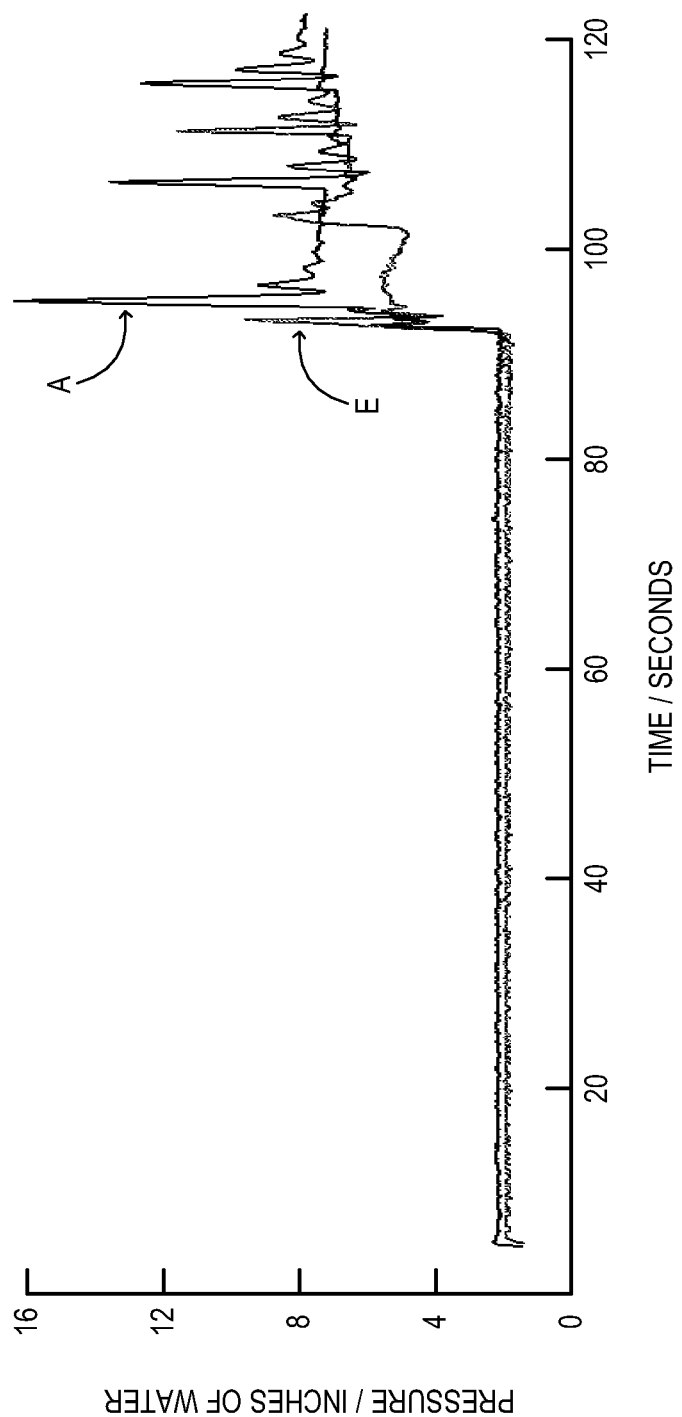
FIG. 5 is a graph of internal pressure in a fuel tank versus refueling time in accordance with embodiments of this disclosure.

The graph of FIG. 5 includes two plots of internal pressure versus time in fuel tank F during the refilling of the fuel tank. The plot marked A is for the fuel tank equipped with vent A; the plot marked plot E if for the fuel tank equipped with vent E. As shown in this graph, the vent tube having the oblique opening provides a lower peak pressure during refueling, which indicates a smoother, less abrupt, and less excessive pressure increase at the full level.

Figure 6:
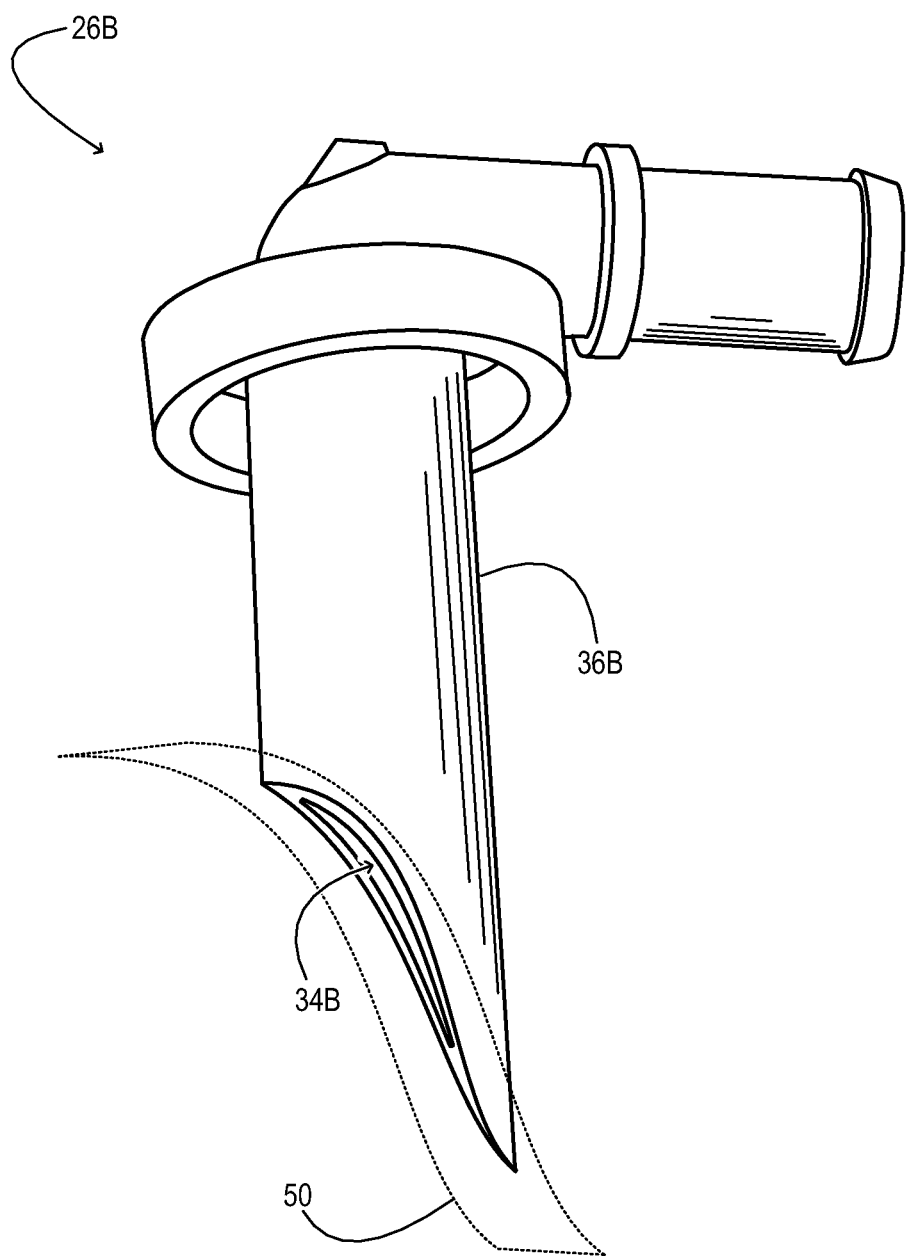
FIGS. 6 and 7 show aspects of other pressure-relief vents in accordance with embodiments of this disclosure.
Figure 7:
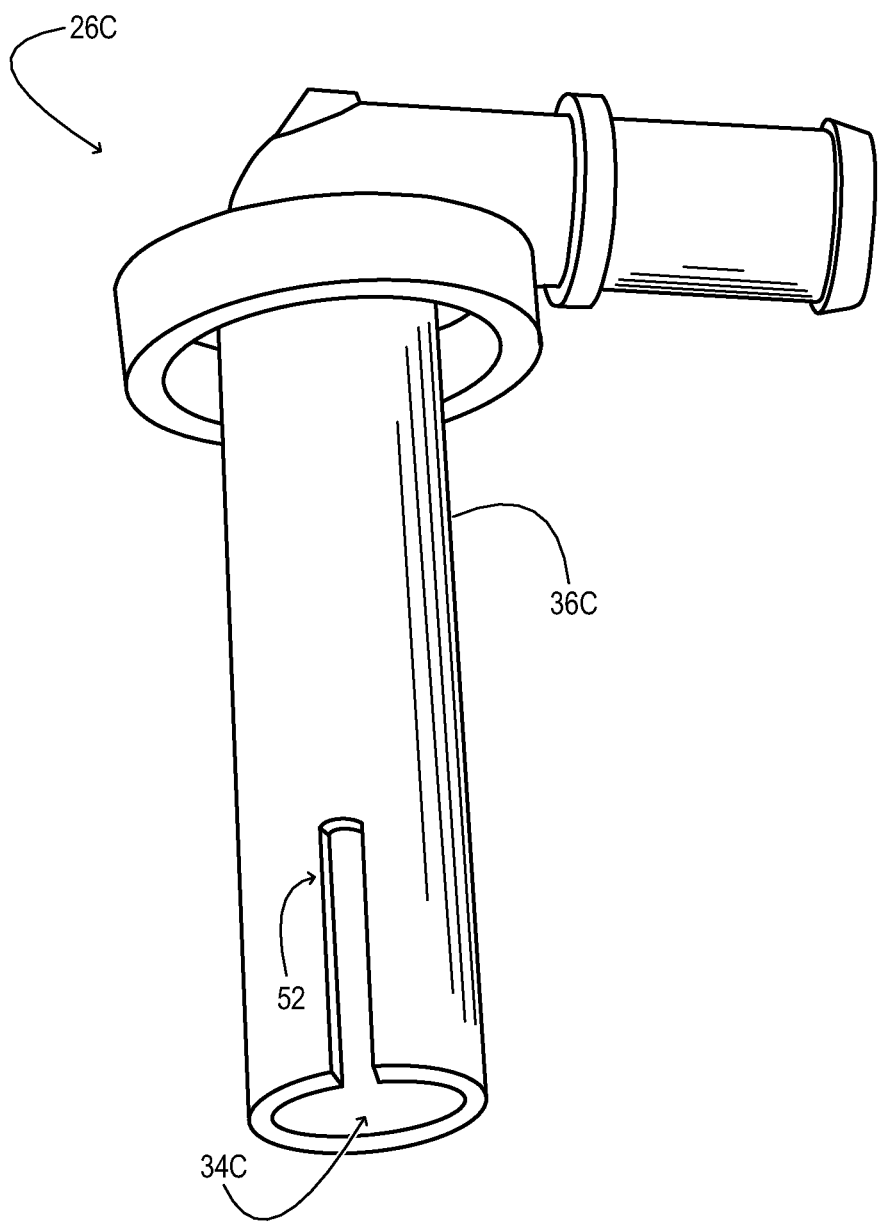

FIGS. 6 and 7 show aspects of other example pressure-relief vents in accordance with this disclosure. In pressure-relief vent 26B, opening 34B is an intersection of cylindrical inlet portion 36B on a smooth, curved surface 50. In pressure-relief vent 26C, opening 34C includes a slit 52, which extends vertically some distance up the vent tube. Like the elliptical opening of vent 26A, the opening in each of these vents admits of a smoothly decreasing non-occluded area as the fuel rises to the cover the opening. FIGS. 6 and 7 are drawn to scale in non-limiting embodiments.

The configurations described above enable various methods to receive fuel in a fuel tank of a motor vehicle. Accordingly, some such methods are now described, by way of example, with continued reference to the above configurations. It will be understood, however, that the methods here described, and others fully within the scope of this disclosure, may be enabled by other configurations as well.

Figure 8:
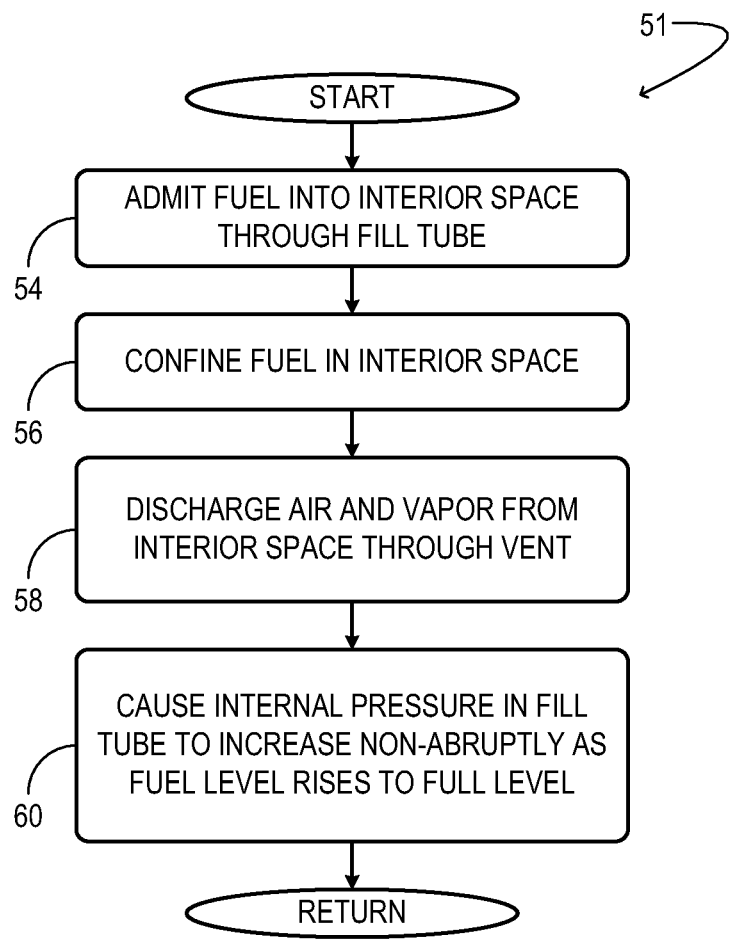
FIG. 8 illustrates a method to receive fuel in a fuel tank of a motor vehicle in accordance with an embodiment of this disclosure.

FIG. 8 illustrates an example method 51 to receive fuel in a fuel tank of a motor vehicle. At 54 of method 51, fuel is admitted into an interior space of a fuel tank through a fill tube. At 56 the fuel is confined in the interior space. At 58 air and vapor are discharged from the interior space through a vent. The vent may include a vent tube extending through the wall and downward into the interior space, the vent tube having a non-circular opening. At 60 the configuration of the vent with respect to the wall of the fuel tank causes the internal pressure in the fill tube to increase smoothly, non-abruptly, and/or non-excessively as the fuel rises to a predetermined full level in the fuel tank. More particularly, the internal pressure may increase non-abruptly to a level sufficient to move fuel up the fill tube to trigger cut off of the fuel supply at the nozzle. The configuration may be such as to ensure a non-abrupt pressure increase, even when the fuel is admitted at a flow rate of sixteen gallons per minute or higher, and from a nozzle twenty-five millimeters or less in diameter. In this manner, ejection of fuel from the fill tube may be prevented.

It will be understood that the articles, systems, and methods described hereinabove are embodiments of this disclosure—non-limiting examples for which numerous variations and extensions are contemplated as well. This disclosure also includes all novel and non-obvious combinations and sub-combinations of the above articles, systems, and methods, and any and all equivalents thereof.

The invention claimed is:

1. A fuel tank comprising:
an interior space defined by a wall;
a fill tube to admit fuel into the interior space;
a vent of the fuel tank to discharge air and vapor to a canister from the interior space as the fuel is admitted, the vent including a vent tube extending through the wall and downward into the interior space, the vent tube having a non-circular opening; and
a siphon located between the fill tube and the vent tube.

2. The fuel tank of claim 1 wherein the opening is elliptical.

3. The fuel tank of claim 1 wherein the vent tube includes a cylindrical inlet portion disposed in the interior space, and wherein the opening is oblique to the cylindrical inlet portion.

4. The fuel tank of claim 3 wherein the opening is defined by an intersection of the cylindrical inlet portion in a plane oblique to the cylindrical inlet portion.

5. The fuel tank of claim 4 wherein the plane is rotated substantially sixty degrees from a central axis of the cylindrical inlet portion.

6. The fuel tank of claim 1 wherein the opening is an intersection of the vent tube on a curved surface.

7. The fuel tank of claim 1 wherein the vent tube extends vertically through the wall.

8. The fuel tank of claim 1 wherein a portion of the vent tube outside the wall is non-vertical, and wherein the vent tube extends only marginally above a highest point on the wall.

9. The fuel tank of claim 1 wherein a portion of the vent tube outside the wall is oriented horizontally.

10. The fuel tank of claim 1 wherein a portion of the vent tube outside the wall is oriented ninety degrees relative to a portion of the vent tube disposed in the interior space.

11. The fuel tank of claim 1 wherein the vent tube extends through a sealing cap that couples the vent to the wall.

12. The fuel tank of claim 1 wherein the opening includes a slit.

13. The fuel tank of claim 12 wherein the slit extends vertically some distance up the vent tube.

14. The fuel tank of claim 1 wherein the vent tube extends below a predetermined full level of fuel in the fuel tank.

15. The fuel tank of claim 14 wherein the vent tube extends less than two inches below the predetermined full level of fuel in the fuel tank.

16. A fuel tank comprising:
an interior space defined by a wall;
a fill tube to admit fuel into the interior space;
formed as a single molded piece, a vent of the fuel tank to discharge air and vapor to a canister from the interior space as the fuel is admitted, the vent including a vent tube extending through and perpendicular to a highest portion of the wall and vertically downward into the interior space, the vent tube having a cylindrical inlet portion disposed in the interior space and an opening defined by an intersection of the cylindrical inlet portion with a plane oblique to the cylindrical inlet portion; and
a siphon located between the fill tube and the vent tube.

17. A method to receive fuel in a fuel tank of a motor vehicle, the method comprising:
   admitting fuel into an interior space of the fuel tank through a fill tube;
   confining the fuel in the interior space;
   discharging air and vapor to a canister from the interior space through a vent of the fuel tank as the fuel is admitted, the vent including a vent tube extending through a wall and downward into the interior space, the vent tube having a non-circular opening; and
   causing an internal pressure in the fill tube to increase non-abruptly as the fuel rises to a predetermined full level in the fuel tank; wherein the vent is positioned away from the fill tube.

18. The method of claim 17 wherein the internal pressure increases non-abruptly to a level sufficient to move the fuel up the fill tube to trigger cut off of a supply of the fuel, wherein a siphon is located between the fill tube and the vent tube.

19. The method of claim 17 wherein the fuel is admitted at a flow rate of sixteen gallons per minute or higher.

20. The method of claim 17 where the fuel is admitted from a nozzle twenty-five millimeters or less in diameter.

* * * * *